No. 814,629. PATENTED MAR. 6, 1906.
J. P. SNEDDON.
METHOD OF REGULATING THE TEMPERATURE OF SUPERHEATED STEAM.
APPLICATION FILED OCT. 28, 1904.
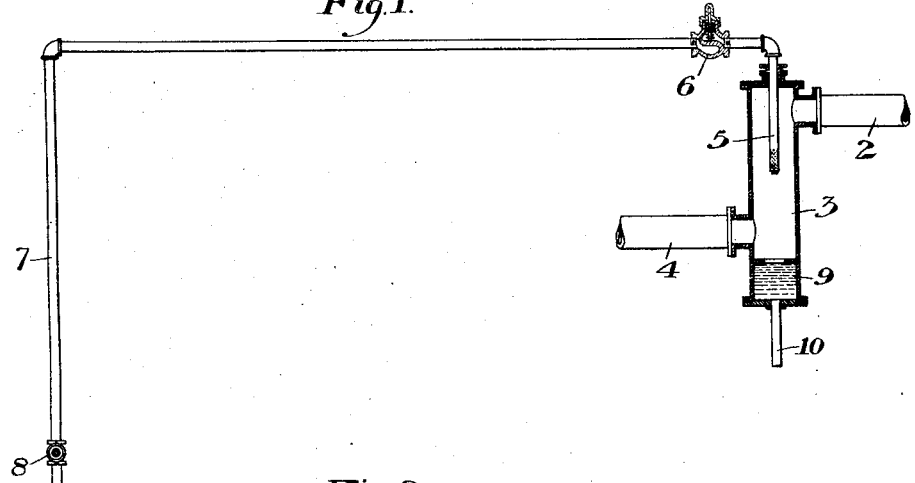
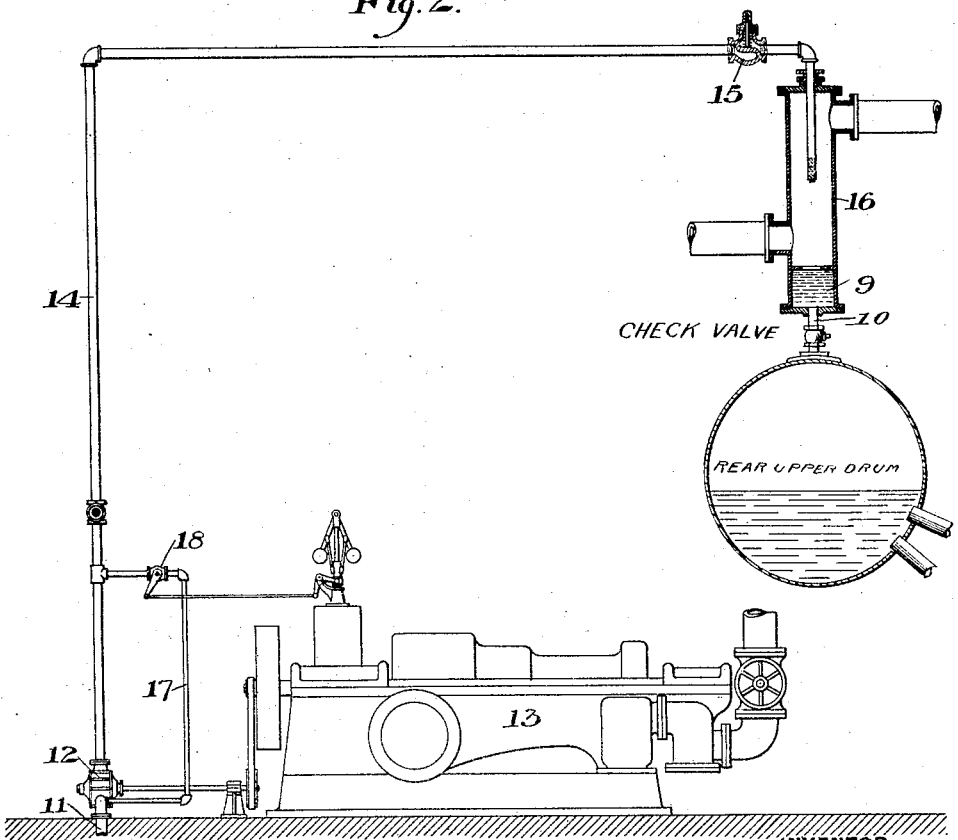
WITNESSES
INVENTOR

UNITED STATES PATENT OFFICE.

JAMES P. SNEDDON, OF BARBERTON, OHIO, ASSIGNOR TO THE STIRLING CONSOLIDATED BOILER COMPANY, OF NEW YORK, N. Y., A CORPORATION OF NEW JERSEY.

METHOD OF REGULATING THE TEMPERATURE OF SUPERHEATED STEAM.

No. 814,629.

Specification of Letters Patent.

Patented March 6, 1906.

Application filed October 28, 1904. Serial No. 230,375.

*To all whom it may concern:*

Be it known that I, JAMES P. SNEDDON, of Barberton, Summit county, Ohio, have invented a new and useful Method of Regulating the Temperature of Superheated Steam, of which the following is a full, clear, and exact description, reference being had to the accompanying drawings, forming part of this specification, in which—

Figure 1 is a diagrammatic view showing one form of apparatus for carrying out my invention, and Fig. 2 is a similar view showing a modified form of apparatus.

My invention relates to the regulation of the amount of superheat in superheated steam, and is designed to provide a new and efficient method of varying the superheat either automatically or under control of the operator. The broad novelty of the invention lies in spraying an excess of water into the steam on its way to the motor, the spraying being regulated either by hand or automatically by a thermostat or connection with the motor-governor or other desirable manner.

In the drawings, referring to Fig. 1, 2 represents a pipe leading from the superheater into a barrel or chamber 3, which may be a portion of the pipe 2. The pipe 4 leads the steam from this chamber to the point of use. Water-spray pipe 5 leads into the chamber 3 and is preferably concentric therewith, this pipe containing a check-valve 6, which is preferably spring-pressed, the pressure being adjustable, so that the water may be forced in at any predetermined pressure above that of the steam. The valve may, however, be used without the spring, so that water will enter at any pressure above the steam-pressure. The water-supply pipe 7 leads from any source of water under pressure above that of the steam-pressure and is provided with a valve 8, which may be either operated by hand if the temperature is to be varied at will or may be connected to a thermostat subjected to the temperature of the steam if a constant temperature of the steam is desired. In order to provide for removing any excess of water which may be sprayed into the steam over and above that taken up by the steam in reducing its temperature, I form a receptacle 9 in the lower part of the chamber 3, from which a pipe 10 leads to a steam-trap or to a boiler if the regulator is located above the water-line. In the operation of the steam water will be sprayed into the steam when the spray-valve is opened, the amount depending, of course, on the amount of opening of the valve. If this spray-valve is controlled by a thermostat, the latter will act to shift the valve and supply water in amounts proper to maintain the steam at a certain temperature. If the spray-valve is controlled by hand, the temperature of the steam can be regulated as desired.

Instead of employing a spray-valve I may control the flow of water under pressure by other means—such as, for example, by a pump driven by the turbine or other motor to which the steam is supplied. Thus in Fig. 2 I show the water-supply pipe 11 as leading to a pump 12, which is connected to and driven by the turbine 13. From the pump the water-supply pipe 14 leads through the spring-pressed check-valve 15 to the chamber 16, which is the same as the chamber 3 in the first form. A by-pass pipe 17, having a valve 18, leads from the pump outlet-pipe to its suction-pipe, the valve being controlled by the governor of the turbine or other motor driven by the steam. In this case the speed of the pump will be substantially constant, and as the load varies upon the turbine its governor will shift the position of the valve 18, and thus control the backflow through the by-pass pipe, and consequently the pressure in the spray-pipe.

Instead of connecting the governor to a valve in the pump and by-pass the pump may be driven by an independent motor, the steam to which is controlled by a throttle-valve connected to the turbine-governor. In this case the speed of the pump will vary with the load on the turbine, and consequently will automatically vary the pressure in the spray-pipe and the amount of water sprayed into the steam.

The advantages of my invention result from the regulating of the temperature by spraying water into the steam, either hand control or automatic control being employed. It also results from the automatic controlling of the spraying which may be regulated by a thermostat device or by the governor on the engine or in any other desirable manner.

Many variations may be made in the form and arrangement of the parts without departing from my invention.

I claim—

1. The method of regulating the temperature of superheated steam, consisting in spraying an excess of water into a conduit through which the superheated steam passes, and withdrawing the surplus water from the conduit.

2. The method of regulating the temperature of superheated steam, consisting in spraying an excess of water into a conduit through which the steam passes from the superheater, and withdrawing the surplus water from the conduit.

3. The method of regulating the temperature of superheated steam, consisting in introducing an excess of water into a conduit through which the superheated steam flows, and withdrawing the surplus water from the conduit.

4. The method of regulating the temperature of superheated steam, consisting in introducing an excess of water into a conduit through which the steam flows from the superheater, and conducting the surplus water from the conduit to the boiler.

In testimony whereof I have hereunto set my hand.

JAMES P. SNEDDON.

Witnesses:
MARY E. HAMLIN,
J. E. BELL.